(12) United States Patent
Onayama

(10) Patent No.: US 8,459,440 B2
(45) Date of Patent: Jun. 11, 2013

(54) ARTICLE SORTING DEVICE

(75) Inventor: Manabu Onayama, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 144 days.

(21) Appl. No.: 13/177,010

(22) Filed: Jul. 6, 2011

(65) Prior Publication Data

US 2012/0006649 A1 Jan. 12, 2012

(30) Foreign Application Priority Data

Jul. 7, 2010 (JP) ................................ 2010-154480

(51) Int. Cl.
*B65G 47/46* (2006.01)

(52) U.S. Cl.
USPC .................................................. 198/370.02

(58) Field of Classification Search
USPC ......................................... 198/370.02, 890.1
See application file for complete search history.

(56) References Cited

U.S. PATENT DOCUMENTS

| | | | | |
|---|---|---|---|---|
| 5,613,591 A | * | 3/1997 | Heit et al. ................. | 198/370.02 |
| 6,139,240 A | | 10/2000 | Ando | |
| 7,249,668 B2 | * | 7/2007 | Verploegen et al. ..... | 198/370.02 |
| 7,383,936 B2 | * | 6/2008 | Enomoto ................. | 198/370.02 |
| 7,506,743 B2 | | 3/2009 | Enomoto | |
| 7,506,744 B2 | | 3/2009 | Enomoto | |
| 7,562,761 B2 | | 7/2009 | Tasma et al. | |
| 2005/0023108 A1 | * | 2/2005 | Verploegen et al. ..... | 198/370.02 |
| 2005/0284730 A1 | * | 12/2005 | Heit et al. ................ | 198/370.02 |
| 2008/0011582 A1 | * | 1/2008 | Verploegen et al. ..... | 198/370.02 |

FOREIGN PATENT DOCUMENTS

| | | |
|---|---|---|
| EP | 1834906 B1 | 11/2009 |
| GB | 2302528 A | 1/1997 |
| JP | 2006-273433 A | 10/2006 |
| JP | 2006-273434 A | 10/2006 |
| JP | 2006-273435 A | 10/2006 |
| JP | 2006-273436 A | 10/2006 |

OTHER PUBLICATIONS

Extended European Search Report of the corresponding European Application No. 11172793.9, dated Dec. 2, 2011.

* cited by examiner

*Primary Examiner* — James R Bidwell
(74) *Attorney, Agent, or Firm* — Global IP Counselors, LLP

(57) ABSTRACT

In an article sorting device including a plurality of slats (article support bodies) overlaying between a pair of endless chains (endless rotation bodies) arranged along a main conveyance route, slats having a longitudinal direction at a right angle to the main conveyance route, and shoes (article lateral pressing bodies) fitted onto the slats slidably in the longitudinal direction of the slats, and guided by a branch guide member provided in a fixed direction relative to the main conveyance route, sliding sections for each of the shoes slidably in contact with each of the slats are positioned in the vicinity of both left and right ends in a sectional view relative to the longitudinal direction of the slats, and the sliding sections are positioned in the vicinity of a lower end in the sectional view.

15 Claims, 8 Drawing Sheets

ARTICLE SORTING DEVICE

BACKGROUND OF THE INVENTION

1. Field of the Invention

The present invention relates to an article sorting device for moving and sorting a predetermined article among articles conveyed on a main conveyance route onto a branch route.

2. Description of the Related Art

Conventionally, an article sorting device provided with a plurality of slats (article support bodies) overlaying between a pair of endless chains (endless rotation bodies) arranged along a main conveyance route, and shoes (article lateral pressing bodies) fitted onto the slats slidably in a longitudinal direction of the slats, and guided by a branch guide member provided in a fixed direction relative to the main conveyance route is used.

For example, JP 2006-273436 A describes an article sorting device capable of enhancing strength without increasing weight of shoes. JP 2006-273433 A describes an article sorting device capable of performing lateral pressing movement at an initial stage in a state that shoes do not nip an article. JP 2006-273434 A describes an article sorting device provided with slats on which other objects are not easily hung up, the slats capable of protecting guide portions of leg plate portions. JP 2006-273435 A describes an article sorting device for preventing that guide portions of slats are deformed at the time of forward and backward movement of shoes, so that the forward and backward movement cannot be stably performed.

However, in these article sorting devices, the shoes are sometimes damaged due to sliding resistance when the shoes slide relative to the slats in the longitudinal direction of the slats. Particularly, when a predetermined article is pressed in the longitudinal direction of the slats in order to sort the article onto a branch route, excessive moment is applied to the shoes by pressing force from the branch guide member and reactive force from the article, so that the shoes are sometimes damaged. In a state that the damaged shoes remain in an article sorting equipment, there is sometimes a case where engagement members of a distributing means for converting a state that the shoes are conveyed along the main conveyance route into a state that the shoes are guided by the branch guide member cannot be engaged with the shoes to convert the direction of the shoes, and thus, the predetermined article sometimes cannot be sorted. Since the shoes sometimes do not slide in the longitudinal direction of the slats due to the damage, the predetermined article sometimes cannot be reliably pressed and moved in the longitudinal direction of the slats by the shoes.

SUMMARY OF THE INVENTION

It is therefore an object of the present invention to provide an article sorting device capable of preventing damage to shoes as far as possible and reliably sorting a predetermined article.

In a first preferred aspect of the present invention, an article sorting device includes a plurality of article support bodies overlaying between a pair of endless rotation bodies arranged along a main conveyance route, the article support bodies having a longitudinal direction at a right angle to the main conveyance route, and article lateral pressing bodies fitted onto the article support bodies slidably in the longitudinal direction, and guided by a branch guide member provided in a fixed direction relative to the main conveyance route, wherein sliding sections for each of the article lateral pressing bodies slidably in contact with each of the article support bodies are positioned in the vicinity of both left and right ends in a sectional view relative to the longitudinal direction.

In a second preferred aspect of the article sorting device according to the present invention, the sliding sections are positioned in the vicinity of a lower end in the sectional view.

In a third preferred aspect of the article sorting device according to the present invention, each of the article lateral pressing bodies is provided with pressing members for elastically pressing each of the article support bodies and sliding relative to the article support body.

In a fourth preferred aspect of the article sorting device according to the present invention, the pressing members press each of the article support bodies in an oblique direction in the sectional view.

In a fifth preferred aspect of the article sorting device according to the present invention, each of the article lateral pressing bodies is fitted onto each of the article support bodies by engaging the article support body into a hollow portion of the article lateral pressing body, and a bottom plate portion of the article lateral pressing body has sliding protrusion portions protruding outward while standing up into the hollow portion and contacting with the article support body so as to form the sliding sections in the sectional view.

In a sixth preferred aspect of the present invention, the article sorting device has opposite sliding protrusion portions provided in lower ends of each of the article support bodies, the opposite sliding protrusion portions protruding inward and contacting with the sliding protrusion portions of each of the article lateral pressing bodies so as to form the sliding sections.

In an eighth preferred aspect of the article sorting device according to the present invention, each of the article support bodies has engagement concave portions including the opposite sliding protrusion portions and sliding plate portions provided in upper parts of the opposite sliding protrusion portions, and the sliding protrusion portions are slidably nipped in the engagement concave portions.

In a ninth preferred aspect of the article sorting device according to the present invention, each of the article support bodies has leg plate portions extending from an intermediate part on a lower surface of an article mount plate portion and continuing to the sliding plate portions.

ADVANTAGES OF THE INVENTION

According to the article sorting device of the present invention, the sliding sections are positioned in the vicinity of both the left and right ends in the sectional view. Thus, by increasing a gap between the sliding sections at two points, the article lateral pressing bodies can stably and smoothly slide, and thereby, damage to the article lateral pressing bodies can be prevented.

Therefore, the predetermined article can be reliably sorted. Further, in a case where the sliding sections for each of the article lateral pressing bodies relative to each of the article support bodies are positioned in the vicinity of the lower end in the sectional view, moment due to application of external force to the article lateral pressing body from the guide member and the like is reduced as far as possible, so that the damage to the article lateral pressing body can be more prevented.

For a full understanding of the present invention, reference should now be made to the following detailed description of the preferred embodiments of the invention as illustrated in the accompanying drawings.

BRIEF DESCRIPTION OF THE DRAWINGS

FIG. 1 (b) is a sectional view by the line A-A in FIG. 1 (a);

DESCRIPTION OF THE PREFERRED EMBODIMENTS

Figure 1A:
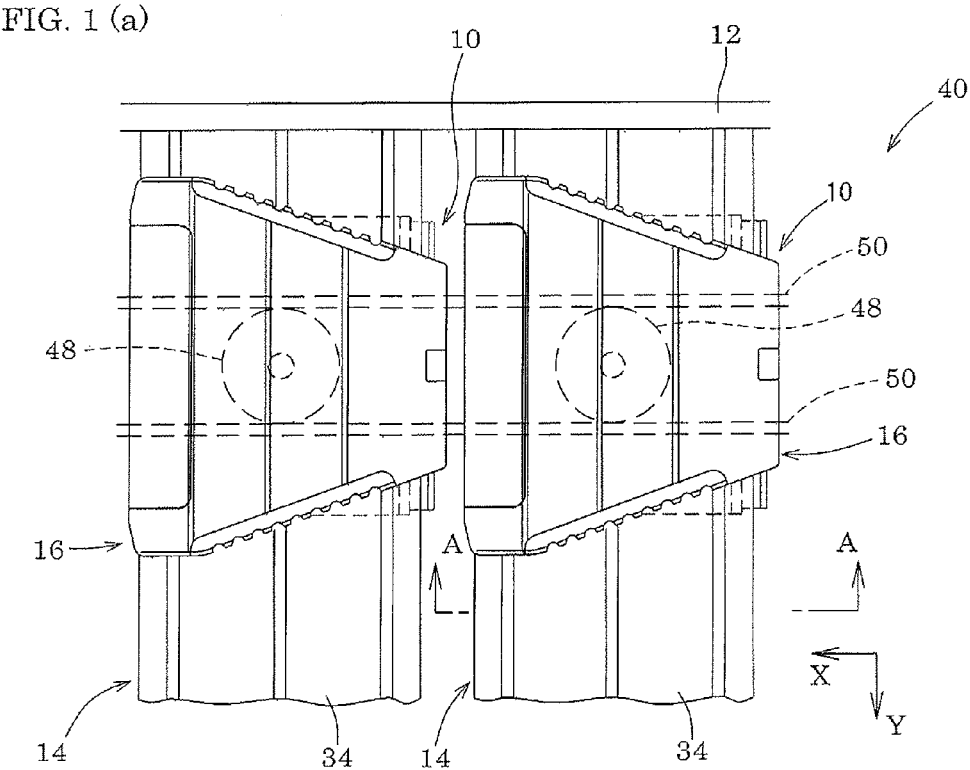
FIG. 1 (a) is a plan view showing an article sorting device according to the present invention.

The preferred embodiments of the present invention will now be described with reference to FIGS. 1-8 of the drawings. Identical elements in the various figures are designated with the same reference numerals. In FIGS. 1, 2, 4, and 5, the reference sign 10 denotes the article sorting device of the present invention.

Figure 1B:
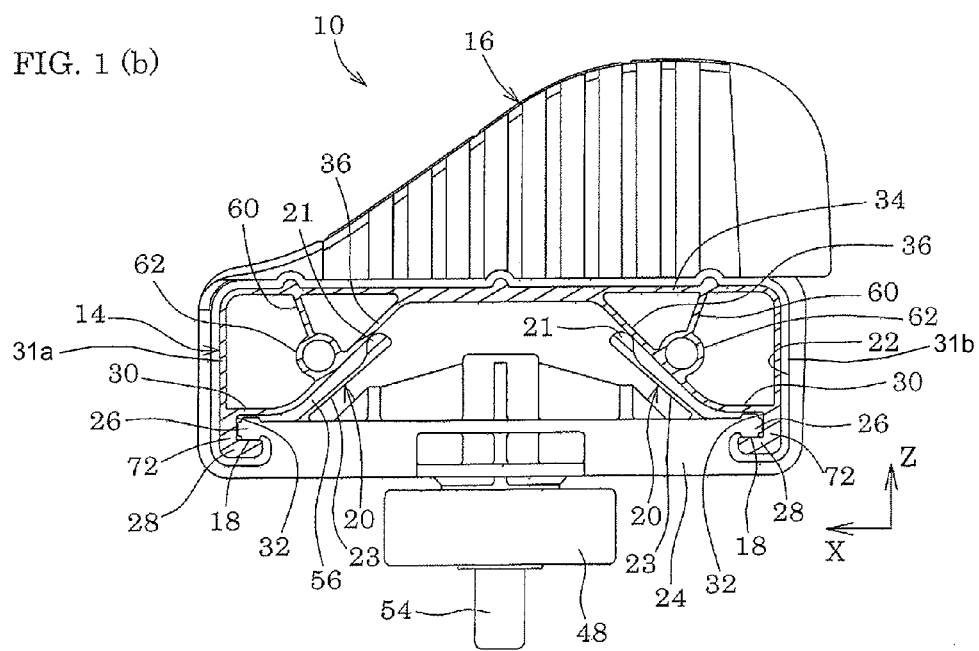
Figure 2:
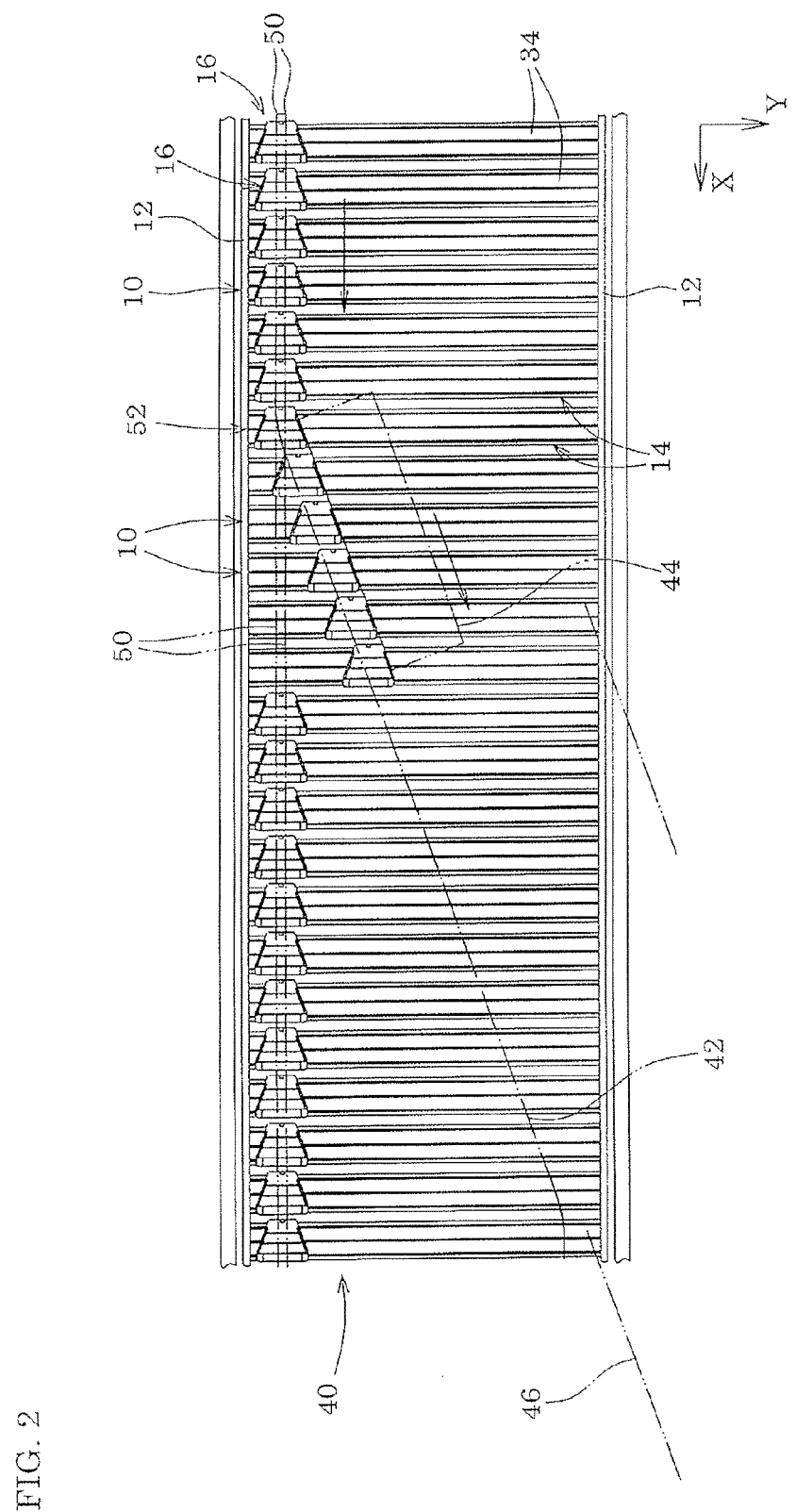
FIG. 2 is a plan view of an article sorting equipment in which the article sorting device in FIG. 1 is arranged.

As shown in FIGS. 1 and 2, the article sorting device 10 of the present invention is provided with a plurality of slats (article support bodies) 14 overlaying between a pair of endless chains (endless rotation bodies) 12 arranged along a main conveyance route 40, the slats having a longitudinal direction at a right angle to the main conveyance route 40, and shoes (article lateral pressing bodies) 16 fitted onto the slats 14 slidably in the longitudinal direction of the slats 14, and guided by a branch guide member 42 provided in a fixed direction relative to the main conveyance route 40. This article sorting device 10 is a device for making a predetermined shoe 16 among the plurality of shoes slide in a Y axis direction serving as the longitudinal direction of the slats 14 by a distributing portion 52 based on a command from a controller (not shown), so as to press a predetermined article 44 among articles 44 conveyed on the main conveyance route 40 in the Y axis direction and move the article onto a branch route 46 shown in FIG. 2.

In this article sorting device 10, sliding sections 18 for each of the shoes 16 slidably in contact with each of the slats 14 are positioned in the vicinity of both left and right ends in a sectional view relative to the longitudinal direction of the slat 14 as shown in FIG. 1(b). The sliding sections 18 for the shoe 16 are also positioned in the vicinity of a lower end in the sectional view relative to the longitudinal direction of the slat 14. Operations and effects with such a configuration will be described later.

As shown in FIG. 2, the plurality of slats 14 in parallel to each other overlay the pair of endless chains 12, and the endless chains are rotated in an X axis direction by a drive means (not shown), which is the conveyance direction of the main conveyance route 40. Each of the plurality of slats 14 running forward in accordance with rotation of the endless chains 12 conveys the article 44 mounted on an article mount plate portion 34 in the X axis direction.

Figure 3:
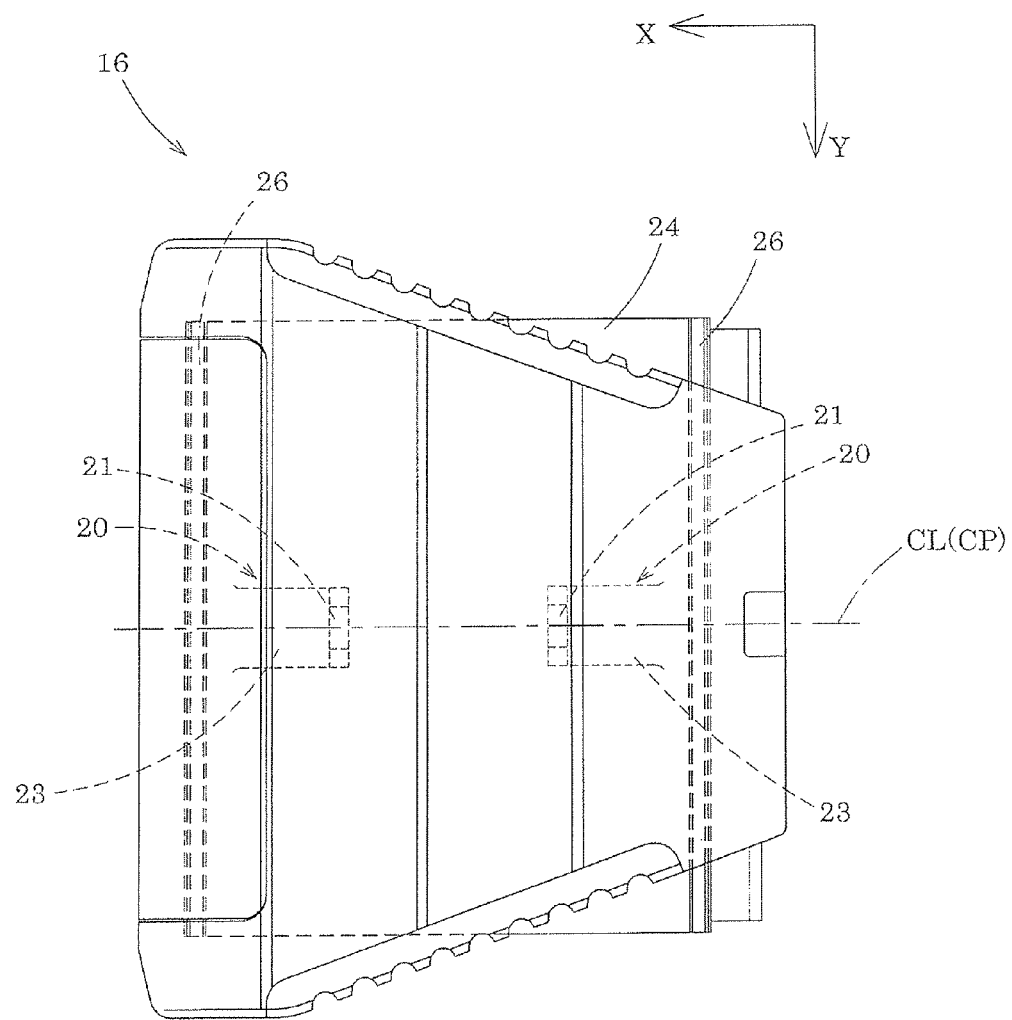
FIG. 3 is a plan view showing an article lateral pressing body of the article sorting device in FIG. 1.

The shoe 16 is slidably fitted onto the slat 14 by engaging the slat 14 into a hollow portion 22, and by sliding relative to the slat 14 in the Y axis direction, presses the predetermined article among the articles 44 conveyed on the main conveyance route 40 in the Y axis direction. The shoe 16 slides in the Y axis direction when a guide roller 48 in a lower part of a bottom plate portion 24 of the shoe 16 running forward with the slat 14 in the X axis direction is guided by the branch guide member 42 and pressing force is applied from the branch guide member 42 to the shoe 16. It should be noted that in the shoe 16 not guided by the branch guide member 42, the guide roller 48 is guided by a main conveyance guide member 50 and the shoe is moved only in the X axis direction along the main conveyance route 40. As shown in FIGS. 1 (b) and 7, the shoe 16 is provided with pressing members 20 extending from the bottom plate portion 24 in an upper oblique direction along leg plate portions 36 of the slat 14 when the shoe 16 is fitted onto the slat 14, the pressing members 20 being integrated with the bottom plate portion 24. Pressing protrusion portions 21 protruding toward the leg plate portions 36 so as to contact with and press the leg plate portions 36 of the slat 14 are provided in front ends of the pressing members 20. Each of the pressing members 20 is formed to be thin so that connection portions 23 extending from the bottom plate portion 24 to the pressing protrusion portions 21 generate elastic distortion in the sectional view, so as to elastically press the leg plate portions 36. That is, the shoe 16 is provided with the pressing members 20 for applying elastic force to and elastically pressing the slat 14 in the oblique direction including an X axis direction component and a Z axis direction component in the sectional view of FIGS. 1(b) and 6, and sliding relative to the leg plate portions 36 of the slat 14. A center line CP of the pressing members 20 matches with a center line CL of the shoe 16 as shown in FIG. 3. Thereby, gravity force from the shoe 16 to the slat 14 is applied line-symmetrically relative to the center line CL, and the shoe 16 smoothly slides relative to the slat 14 while being stably supported by the slat 14.

The bottom plate portion 24 of the shoe 16 has sliding protrusion portions 26 protruding outward while standing up into the hollow portion 22 and contacting with the slat 14 so as to form the sliding sections 18 in the sectional view of FIG. 1(b). Meanwhile, opposite sliding protrusion portions 28 protruding inward and contacting with the sliding protrusion portions 26 of the shoe 16 so as to form the sliding sections 18 are provided in a lower end of the slat 14. By forming the sliding sections 18 by such sliding protrusion portions 26 and the opposite sliding protrusion portions 28, the sliding sections 18 can be positioned in the vicinity of both the left and right ends and positioned in the vicinity of the lower end in the sectional view.

Figure 7:
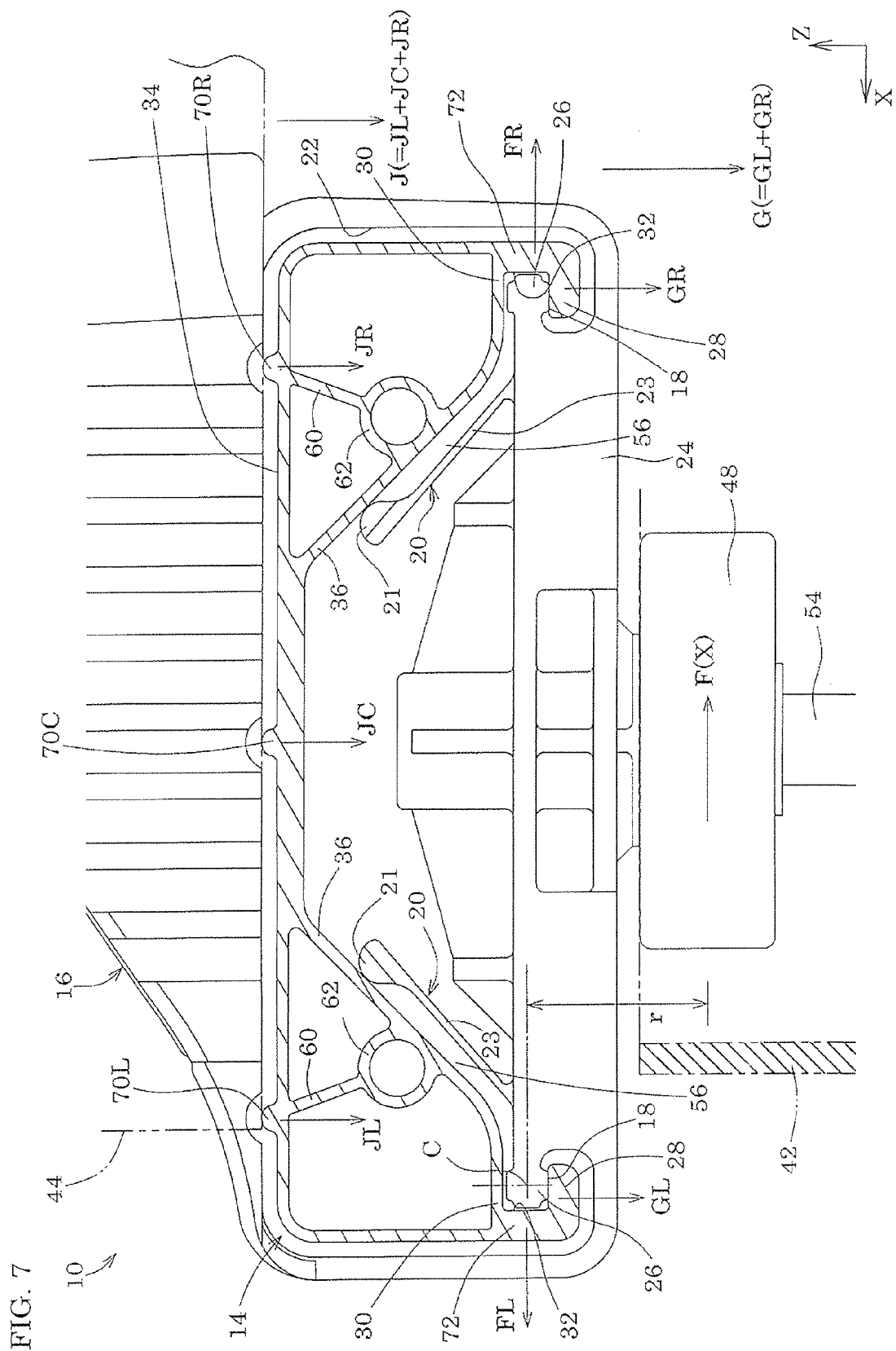
FIG. 7 is an enlarged sectional view by the line A-A showing the use state of the article sorting device in FIG. 1.

In the article sorting device 10, as shown in FIG. 1(b), the slat 14 includes a first end wall 31a and a second wall 31b, the first end wall 31a extending downward from a first outboard edge of the article mount plant portion 34 (a mounting plate), the second end wall 31b extending downward from a second outboard edge of the article mount plant portion 34 (the mounting plate) opposite from the first outboard edge. The lower ends of each of the first end wall 31a and the second end wall 31b of the slat 14 has engagement concave portions 32 including the opposite sliding protrusion portions 28, sliding plate portions 30 provided in upper parts of the opposite sliding protrusion portions 28, and intermediate plate portions 72 continuing to the opposite sliding protrusion portions 28 and the sliding plate portions 30. The sliding protrusion portions 26 are slidably nipped in the engagement concave portions 32. The slat 14 also has the leg plate portions 36 extending from an intermediate part on a lower surface of the article mount plate portion 34 and continuing to the sliding plate portions 30. Further, the slat 14 is provided with reinforcing members 60 extending from intermediate parts on upper surfaces of the leg plate portions 36 in the upper oblique direction and continuing to the lower surface of the article mount plate portion 34. The reinforcing members 60 continue to the leg plate portions 36 via cylindrical portions 62 having hollow parts. Regarding plate thickness of the slat 14, as shown in FIG. 7, a center part of the article mount plate portion 34, the opposite sliding protrusion portions 28, and the intermediate plate portions 72 are thicker than other parts. The center part of the article mount plate portion 34 is thickened, because gravity force JC is applied from the article 44 to an article side protrusion portion 70C thereof. The opposite sliding protrusion portions 28 are thickened, because gravity force GL or GR from the shoe 16 is applied from the sliding protrusion portions 26 of the shoe 16. The intermediate plate portion 72 on the left side in the sectional view is thickened, because pressing force FL is applied from the sliding protrusion portion 26 on the left side in the sectional view of the slat 14 due to reactive force from the article 44 to the shoe 16 when the shoe 16 is guided by the branch guide member 42. The intermediate plate portion 72 on the right side in the sectional view is thickened, because pressing force FR (=F (X)) is applied from the sliding protrusion portion 26 on the right side in the sectional view of the slat 14 due to pressing force F (X) from the branch guide member 42 to the shoe 16 when the shoe 16 is guided by the branch guide member 42. It should be noted that since gravity force JL and gravity force JR from the article 44 are also applied to article side protrusion portions 70L and 70R of the article mount plate portion 34, the reinforcing members 60 are provided in lower parts of the article side protrusion portions 70L and 70R.

Hereinafter, the operations and the effects of the article sorting device 10 with such a configuration will be described based on the drawings.

Figure 4:
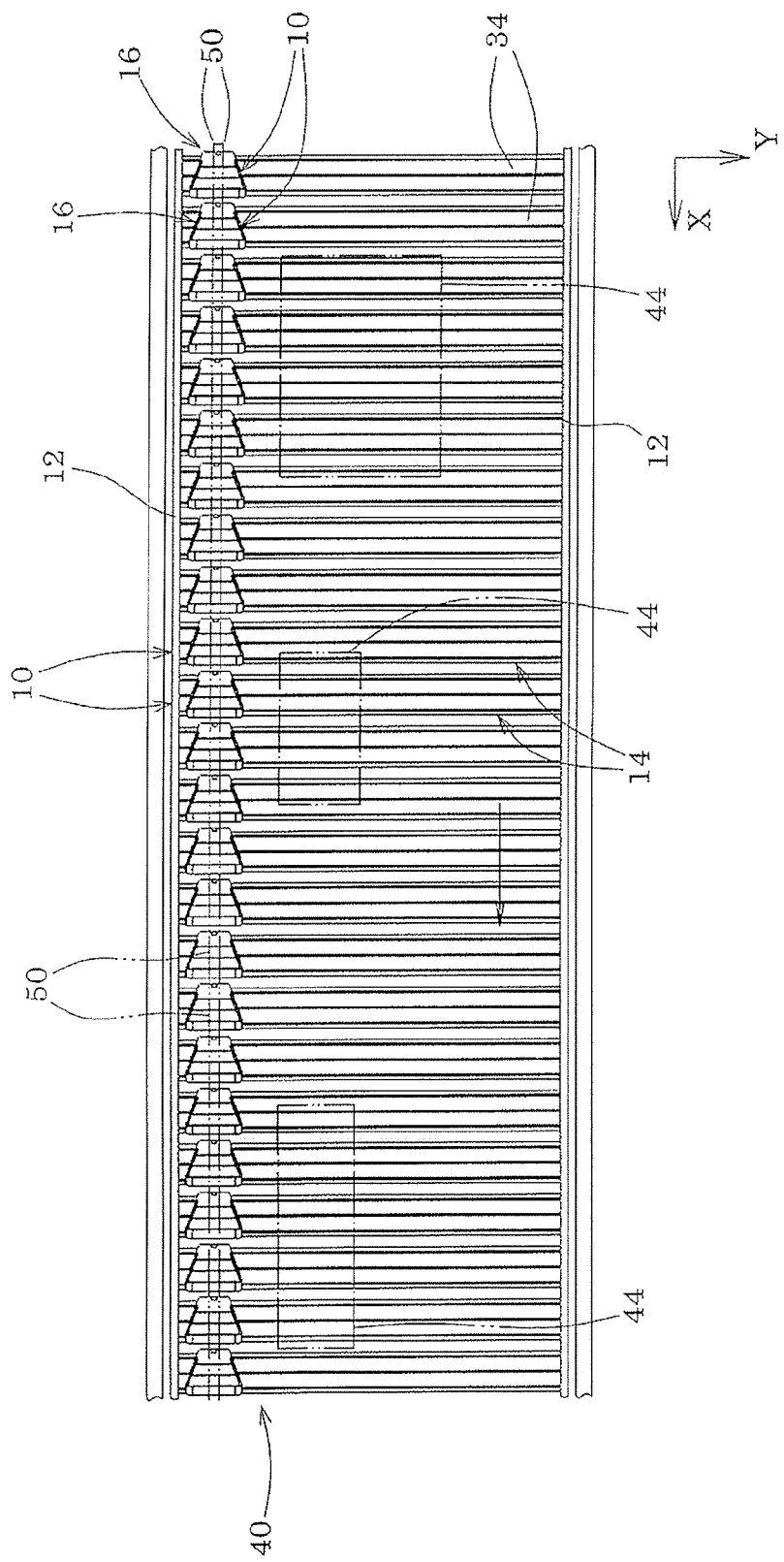
FIG. 4 is a plan view showing a previous process of a process in which the article sorting device in FIG. 1 is arranged.

Firstly, as shown in FIG. 4, the articles 44 among which the predetermined article 44 is sorted onto the branch route 46 while being conveyed along and on the main conveyance route 40 are mounted on the plurality of slats 14. By rotating the endless chains 12 by a drive means (not shown), the plurality of slats 14 overlaying the endless chains 12 convey the mounted articles 44 to a post process in the X axis direction. At this time, since the guide rollers 48 are guided by the main conveyance guide members 50, the shoes 16 are moved in the X axis direction.

In the post process, in a case where the conveyed article 44 is the predetermined article 44 to be sorted onto the branch route 46 as shown in FIG. 2, the shoe 16 adjacent to the article 44 is converted from a state that the guide roller 48 of the shoe 16 is guided by the main conveyance guide member 50 to a state that the guide roller 48 is guided by the branch guide member 42 in the distributing portion 52. A configuration of a distributing means of the distributing portion 52 is the same as a conventional distributing means (such as distributing means denoted by the reference signs 132A and 132B in JP 2006-273436 A). The shoe 16 with the guide roller 48 guided by the branch guide member 42 is moved along the branch guide member 42 while sliding in the longitudinal direction of each of the slats 14 by the pressing force from the branch guide member 42. By moving the shoe 16 along the branch guide member 42, the shoe 16 contacts with and presses the adjacent article 44 and moves the article 44 along the branch guide member 42, so as to guide the article to the branch route 46.

Figure 5:
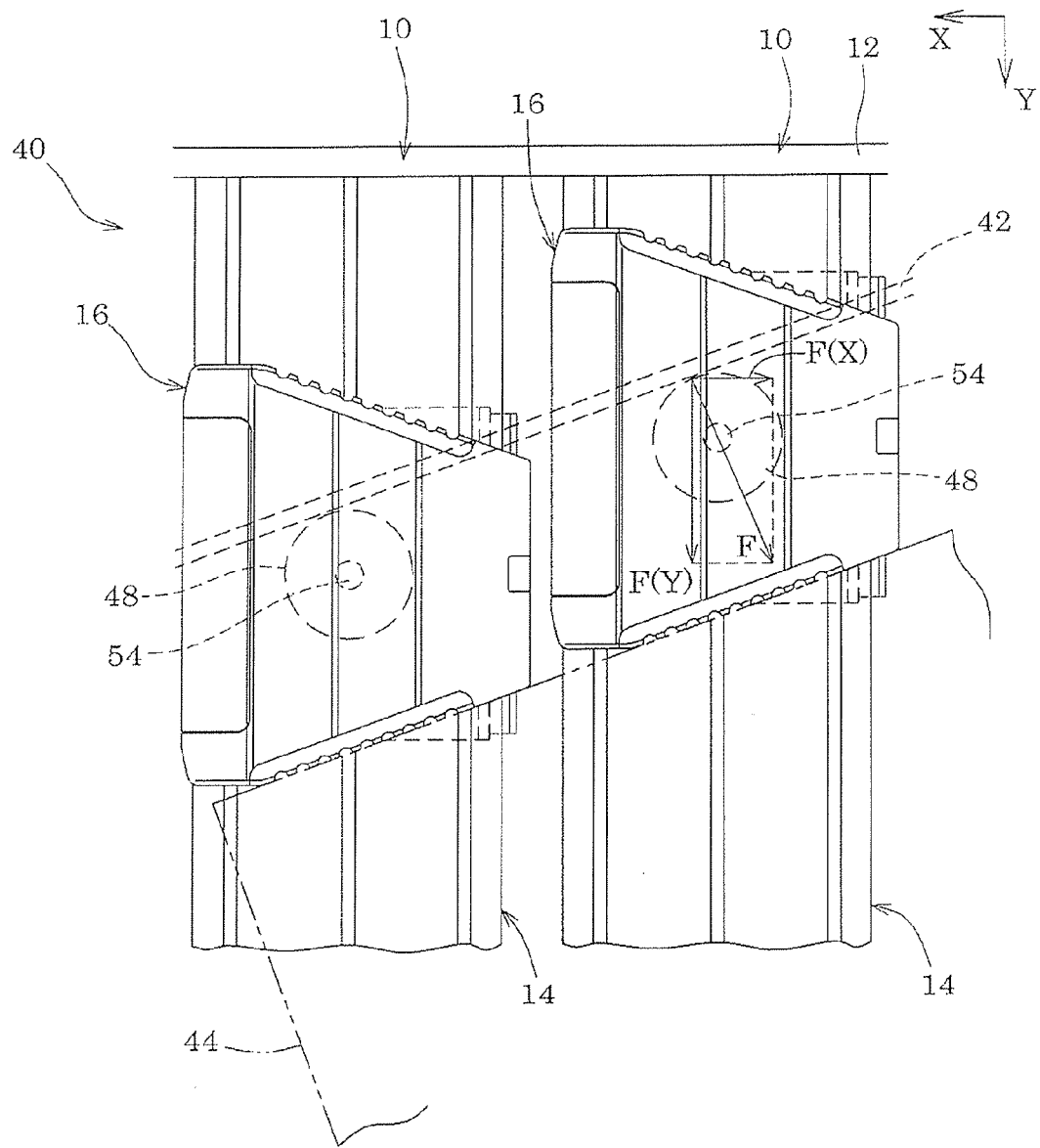
FIG. 5 is a plan view showing a use state of the article sorting device in FIG. 1.
Figure 6:
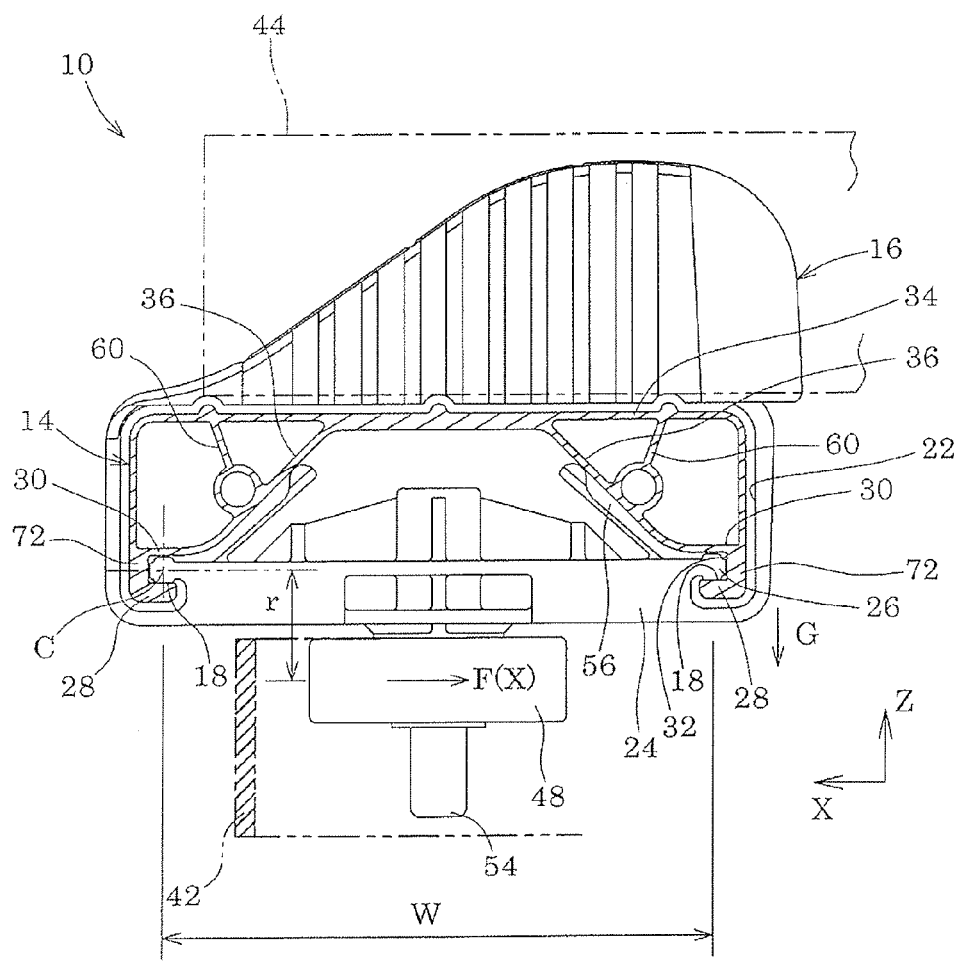
FIG. 6 is a sectional view by the line A-A showing the use state of the article sorting device in FIG. 1.

At this time, as shown in FIGS. 5, 6, and 7, gravity force G is applied from the shoe 16 to the slat 14, and pressing force F is applied from the branch guide member 42 to the guide roller 48. The gravity force G is applied from the sliding sections 18 at two points. However, since the sliding sections 18 at two points are positioned in the vicinity of both the left and right ends in the sectional view relative to the longitudinal direction of the slat 14, by increasing a gap W between the sliding sections 18 at two points as far as possible, the shoe 16 can stably and smoothly slide without shifting. Moment on a center C is applied to the shoe 16 by the pressing force F. However, since the sliding sections 18 are positioned in the vicinity of the lower end in the sectional view, a radius r on the center C of the pressing force F can be decreased as far as possible, so that moment Fxr can be reduced as far as possible. Therefore, damage to the shoe 16 can be prevented as far as possible. It should be noted that such operations and effects of reducing the moment Fxr as far as possible are the same as in a case where pressing force is applied to a roller shaft 54 in the distributing portion 52 or the like.

Figure 8:
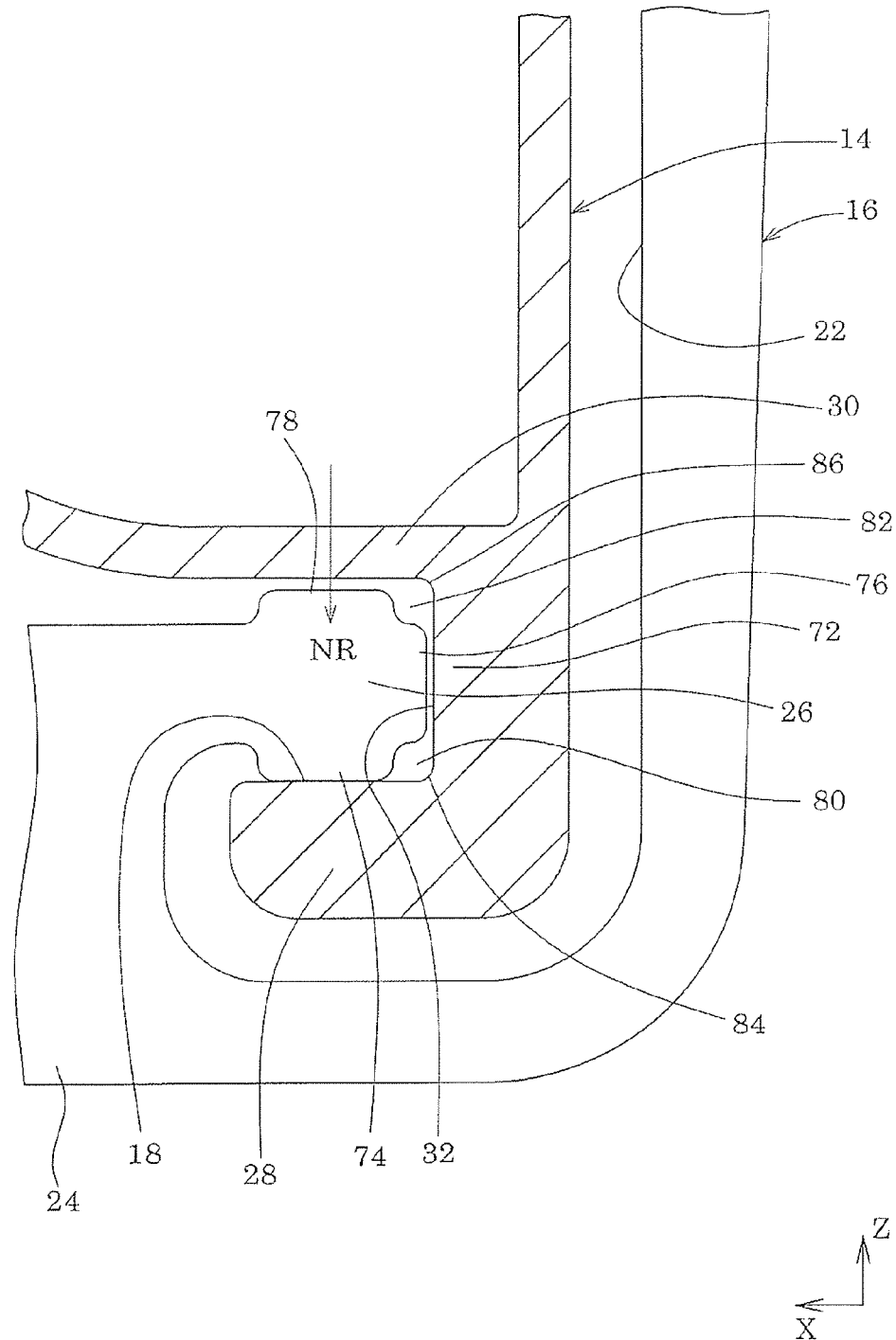
FIG. 8 is an enlarged sectional view by the line A-A of major parts showing the use state of the article sorting device in FIG. 1.

In the article sorting device 10, the sliding protrusion portions 26 are slidably nipped in the engagement concave portions 32. Thus, the shoe 16 is not displaced relative to the slat 14 in the X axis or Z axis direction, so that the shoe 16 can stably slide relative to the slat 14 in the Y axis direction. Particularly, a positional relationship between the shoe 16 and the slat 14 can be stabilized in the vicinity of a lower part of the article sorting device 10. As shown in FIG. 8, each of the sliding protrusion portions 26 is provided with a convex portion 74 sliding relative to the opposite protrusion portion 28, a convex portion 76 sliding relative to the intermediate plate portion 72, and a convex portion 78 sliding relative to the sliding plate portion 30, so that gaps 80 and 82 are formed. By forming the gaps 80 and 82, the sliding protrusion portion 26 does not contact with corner portions 84 and 86 of the engagement concave portion 32. Thus, friction force is reduced as far as possible, so that the shoe 16 can smoothly slide relative to the slat 14. When the shoe 16 is moved along the branch guide member 42 and the moment on the center C is applied to the shoe 16 by the pressing force F from the branch guide member 42, force of rotating the shoe 16 counterclockwise in the sectional view of FIG. 7 is applied. However, as shown in FIG. 8, the rotation is regulated by reactive force NR from the sliding plate portion 30 to the sliding protrusion portion 26, and furthermore, the sliding protrusion portion 26 slides relative to the sliding plate portion 30. Thus, the shoe 16 does not shift in the Z axis direction, so that the shoe 16 can be smoothly moved along the branch guide member 42. Meanwhile, since the shoe 16 is provided with the pressing members 20 for elastically pressing the leg plate portions 36 of the slat 14 in the oblique direction, the positional relationship between the shoe 16 and the slat 14 can also be stabilized on the upper side of the sliding sections 18. Therefore, the positional relationship between the shoe 16 and the slat 14 is stabilized in the entire article sorting device 10, so that the shoe 16 can smoothly slide relative to the slat 14 in the Y axis direction.

Next, according to the article sorting device 10, the leg plate portions 36 of the slat 14 extend from the intermediate part on the lower surface of the article mount plate portion 34 and continue to the sliding plate portions 30. Thus, the slat 14 can ensure spaces 56 gradually widened toward the lower side for housing the bottom plate portion 24 of the shoe 16. Thereby, the sliding sections 18 can be positioned in the vicinity of both the left and right ends and positioned in the vicinity of the lower end in the sectional view. Since the leg plate portions 36 integrally continue to the sliding plate portions 30, the slat 14 can be reinforced by the leg plate portions 36 and the sliding plate portions 30, so that strength of the entire slat 14 can be enhanced. That is, one plate portion in which the leg plate portion 36 integrally continues to the sliding plate portion 30 can serve as both a member for forming the engagement concave portion 32, and a member for reinforcing the slat 14. Further, since the slat 14 is provided with the reinforcing members 60 continuing from the article mount plate portion 34 to the leg plate portions 36 via the cylindrical portions 62 having the hollow parts, weight of the slat 14 can be reduced while reinforcing the slat 14 more firmly.

Although one embodiment of the present invention has been described as above, the present invention can adopt other modes. For example, a case where the shoe 16 for pressing the article 44 slides relative to the slat 14, and the article 44 is guided to the branch route 46 while directing the article 44 in the oblique direction relative to the X axis direction in a plan view of FIG. 2 is described. However, the present invention may be applied to a case where the shoe 16 for pressing the article 44 slides relative to the slat 14, and the article 44 is guided to the branch route 46 while directing the article 44 in a parallel direction relative to the X axis direction. Alternatively, a case where the articles 44 are sorted from the main conveyance route 40 onto one branch route on one side relative to the conveying direction thereof is described. However, the present invention may be applied to a case where the articles 44 are sorted onto branch routes 46 on both sides relative to the conveying direction. The case where the articles 44 are sorted onto the branch routes 46 on the both sides relative to the conveying direction includes a case where the articles 44 are sorted onto one branch route 46 on one side and one branch route 46 on the other side relative to the conveying direction, a case where the articles 44 are sorted onto a plurality of branch routes 46 on one side and a plurality of branch routes 46 on the other side relative to the conveying direction, and a case where the articles 44 are sorted onto one branch route 46 on one side relative to the conveying direction and the articles 44 are also sorted onto a plurality of branch routes 46 on the other side. Further, the present invention may also be applied to a case where the articles 44 are sorted onto a plurality of branch routes 46 on one side relative to the conveying direction of the main conveyance route 40. In addition, the technical scope of the present invention includes variously improved, corrected, and modified modes based on knowledge of those skilled in the art within a range not departing from the gist thereof. Any of particular matters of the invention may be replaced by other technologies within a range where the same operations or effects are generated.

INDUSTRIAL APPLICABILITY

According to the article sorting device of the present invention, by making the article lateral pressing bodies slide stably and smoothly, and preventing the damage to the article lateral pressing bodies, the predetermined article can be reliably sorted. Therefore, the present invention can be widely utilized as the article sorting device for sorting the predetermined article such as a product, an agricultural product, or a container.

This application claims priority from Japanese Patent Application No. 2010-154480, which is incorporated herein by reference.

There has thus been shown and described a novel article sorting device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An article sorting device comprising:
    a plurality of article support bodies overlaying between a pair of endless rotation bodies arranged along a main conveyance route, each of the article support bodies having a longitudinal direction at a right angle relative to the main conveyance route, each of the article support bodies having a mount plate portion, a first end wall and a second end wall, the first end wall extending downward from a first outboard edge of the mounting plate, the second end wall extending downward from a second outboard edge of the mounting plate opposite from the first outboard edge; and
    article lateral pressing bodies fitted onto the article support bodies slidably in the longitudinal direction, and guided by a branch guide member provided in a fixed direction relative to the main conveyance route, wherein sliding sections for each of the article lateral pressing bodies slidably in contact with each of the article support bodies are positioned at lower ends of the first end wall and the second end wall.

2. The article sorting device according to claim 1, wherein each of the article lateral pressing bodies is provided with pressing members for elastically pressing each of the article support bodies and sliding relative to the article support body.

3. The article sorting device according to claim 2, wherein each of the article lateral pressing bodies is fitted onto each of the article support bodies by engaging the article support body into a hollow portion of the article lateral pressing body, and
    a bottom plate portion of the article lateral pressing body has sliding protrusion portions protruding outward while standing up into the hollow portion and contacting with the article support body so as to form the sliding sections in the sectional view.

4. The article sorting device according to claim 3, having:
    opposite sliding protrusion portions provided in lower ends of each of the article support bodies, the opposite sliding protrusion portions protruding inward and contacting with the sliding protrusion portions of each of the article lateral pressing bodies so as to form the sliding sections.

5. The article sorting device according to claim 4, wherein each of the article support bodies has engagement concave portions including the opposite sliding protrusion portions and sliding plate portions provided in upper parts of the, opposite sliding protrusion portions, and
    the sliding protrusion portions are slidably nipped in the engagement concave portions.

6. The article sorting device according to claim 5, wherein each of the article support bodies has leg plate portions extending from an intermediate part on a lower surface of an article mount plate portion and continuing to the sliding plate portions.

7. The article sorting device according to claim 1, wherein each of the article lateral pressing bodies is fitted onto each of the article support bodies by engaging the article support body into a hollow portion of the article lateral pressing body, and
    a bottom plate portion of the article lateral pressing body has sliding protrusion portions protruding outward while standing up into the hollow portion and contacting with the article support body so as to form the sliding sections in the sectional view.

8. The article sorting device according to claim 7, having:
opposite sliding protrusion portions provided in lower ends of each of the article support bodies, the opposite sliding protrusion portions protruding inward and contacting with the sliding protrusion portions of each of the article lateral pressing bodies so as to form the sliding sections.

9. The article sorting device according to claim 8, wherein each of the article support bodies has engagement concave portions including the opposite sliding protrusion portions and sliding plate portions provided in upper parts of the opposite sliding protrusion portions, and
the sliding protrusion portions are slidably nipped in the engagement concave portions.

10. The article sorting device according to claim 9, wherein each of the article support bodies has leg plate portions extending from an intermediate part on a lower surface of an article mount plate portion and continuing to the sliding plate portions.

11. An article sorting device device comprising:
a plurality of article support bodies overlaying between a pair of endless rotation bodies arranged along a main conveyance route, the article support bodies having a longitudinal direction at a right angle relative to the main conveyance route; and
article lateral pressing bodies fitted onto the article support bodies slidably in the longitudinal direction, and guided by a branch guide member provided in a fixed direction relative to the main conveyance route, wherein sliding sections for each of the article lateral pressing bodies slidably in contact with each of the article support bodies are positioned in the vicinity of both left and right ends in a sectional view relative to the longitudinal direction, each of the article lateral pressing bodies is provided with pressing members for elastically pressing each of the article support bodies and sliding relative to the article support body, and the pressing members press each of the article support bodies in an oblique direction in the sectional view.

12. The article sorting device according to claim 11, wherein each of the article lateral pressing bodies is fitted onto each of the article support bodies by engaging the article support body into a hollow portion of the article lateral pressing body, and
a bottom plate portion of the article lateral pressing body has sliding protrusion portions protruding outward while standing up into the hollow portion and contacting with the article support body so as to form the sliding sections in the sectional view.

13. The article sorting device according to claim 12, having:
opposite sliding protrusion portions provided in lower ends of each of the article support bodies, the opposite sliding protrusion portions protruding inward and contacting with the sliding protrusion portions of each of the article lateral pressing bodies so as to form the sliding sections.

14. The article sorting device according to claim 13, wherein each of the article support bodies has engagement concave portions including the opposite sliding protrusion portions and sliding plate portions provided in upper parts of the opposite sliding protrusion portions, and
the sliding protrusion portions are slidably nipped in the engagement concave portions.

15. The article sorting device according to claim 14, wherein each of the article support bodies has leg plate portions extending from an intermediate part on a lower surface of an article mount plate portion and continuing to the sliding plate portions.

* * * * *